(12) United States Patent
Doll (10) Patent No.: US 12,246,575 B2
(45) Date of Patent: Mar. 11, 2025

(54) VENTILATION OUTLET WITH A CONTROL ELEMENT AND AN ACTUATING KNOB

(71) Applicant: Faurecia Innenraum Systeme GmbH, Hagenbach (DE)

(72) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 396 days.

(21) Appl. No.: 18/051,288

(22) Filed: Oct. 31, 2022

(65) Prior Publication Data

US 2023/0147414 A1    May 11, 2023

(30) Foreign Application Priority Data

Nov. 2, 2021   (DE) .................... 10 2021 212 344.9

(51) Int. Cl.
*B60H 1/00*     (2006.01)
*B60H 1/34*     (2006.01)

(52) U.S. Cl.
CPC ......... *B60H 1/0065* (2013.01); *B60H 1/3421* (2013.01); *B60H 2001/3471* (2013.01)

(58) Field of Classification Search
CPC ... B60Q 3/14; B60Q 3/20; B60Q 3/60; B60Q 3/62; B60Q 3/64; B60Q 3/66; B60Q 2500/20; B60H 1/0065; B60H 1/34; B60H 1/3414; B60H 1/3421; B60H 1/3428; B60H 1/3435; B60H 1/3442; B60H 2001/3471; B60H 2001/3478; B60H 2001/3464; F24F 13/078; G05G 1/015

USPC ................................ 454/152, 153, 154, 155
See application file for complete search history.

(56) References Cited

FOREIGN PATENT DOCUMENTS

| | | | | |
|---|---|---|---|---|
| DE | 8815072 | U1 | 1/1989 | |
| DE | 3909645 | C2 | 3/1993 | |
| DE | 202013105590 | U1 * | 3/2014 | ........... B60H 1/3414 |
| DE | 202018100789 | U1 | 5/2018 | |
| DE | 102018104043 | A1 | 8/2019 | |
| DE | 102022103598 | A1 * | 9/2022 | |
| EP | 1832452 | B1 | 11/2010 | |
| EP | 2881273 | B1 | 11/2018 | |
| JP | 2010100111 | A * | 5/2010 | |
| JP | 2010137816 | A * | 6/2010 | |

(Continued)

OTHER PUBLICATIONS

"German Application Serial No. 102021212344.9, Search Report mailed Feb. 9, 2022", 8 pgs.

*Primary Examiner* — Mark A Laurenzi
*Assistant Examiner* — Xiaoting Hu
(74) *Attorney, Agent, or Firm* — Schwegman Lundberg & Woessner, P.A.

(57) ABSTRACT

Disclosed is a ventilation outlet including one or more flow directing elements arranged movably in a housing and with an actuating element mounted movably on the housing with an actuating knob for actuating at least one flow directing element for controlling a ventilation gas flow and with a light source for illuminating the actuating knob. A movable mounting of the actuating element permits a movement of the actuating element with at least one degree of freedom and the light source is arranged outside the actuating knob in such a way that light can be coupled into the actuating knob and at least partially illuminates an operating side of the actuating knob from the inside.

20 Claims, 5 Drawing Sheets

(56) References Cited

FOREIGN PATENT DOCUMENTS

JP 2010143338 A * 7/2010 ........... B60Q 3/0243
JP 2014043220 A * 3/2014

* cited by examiner

VENTILATION OUTLET WITH A CONTROL ELEMENT AND AN ACTUATING KNOB

CLAIM FOR PRIORITY

This application claims the benefit of priority of German Application No. 10 2021 212 344.9, filed Nov. 2, 2021, which is hereby incorporated by reference in its entirety.

TECHNICAL FIELD

The present disclosure is directed to ventilation technology and involves aspects of mechanical engineering, electrical engineering and lighting technology.

BACKGROUND

Ventilation outlets are provided in ventilation systems to control a ventilation flow and, for example, to discharge fresh air in a controllable manner at points provided for this purpose. In many cases, both the intensity of the ventilation flow and its direction can be selected.

Ventilation outlets are of particular importance, for example, in vehicles or other means of transport, where ventilation also influences the temperature and humidity, for example. For example, ventilation in the area of a vehicle windshield can be controlled in a targeted manner to prevent fogging. Other outlets are designed to let out fresh cool or warm air at certain points of the vehicle, for example, also depending on its occupancy by passengers. Similar objects also arise, for example, with ventilation outlets inside aircraft, ships and rail vehicles.

In many cases, levers or actuating knobs are typically provided to allow opening, closing, as well as partial opening and/or selection of a flow direction at the ventilation outlet.

Some control or actuating knobs are illuminated to make them more noticeable and to attract the attention of an operator and to facilitate operation in the dark.

For example, a design is known from DE 39 09 645 C2 in which an operating knob is displaceable along a rail, the rail consisting of an optically transparent material into which light is coupled. Where the actuating knob is positioned on the rail, light from the material of the rail is transferred to the knob and illuminates an operating side of the knob from the inside.

From EP 1 832 452 B1 it is known to arrange several parallel guiding elements for a ventilation flow and to manufacture them from a light-conducting material, so that light can be coupled into the guiding elements and can be guided out at an actuating knob which is placed on one of the guiding elements.

From EP 2 881 273 B1 it is known to provide a light guide body on the front side of a guide element for the air flow at a ventilation outlet, which guides light and on which an actuating knob is placed. Light is then introduced from the light guide body into the actuating knob so that it is illuminated from its inside.

SUMMARY/OVERVIEW

The present disclosure is directed to providing a ventilation outlet in which an actuating knob can be moved as much as possible and the effort required to direct light toward the actuating knob is minimized.

The disclosure thus relates to a ventilation outlet with one or more flow directing elements movably arranged in a housing and with an actuating element movably mounted on the housing with an actuating knob for actuating at least one flow directing element for controlling, in particular for directing, a ventilation gas flow and with a light source for illuminating the actuating knob, wherein a movable mounting of the actuating element allows for a movement of the actuating element with at least one degree of freedom and wherein the light source is arranged outside the actuating knob and in particular also outside the actuating element in such a way that its light can be coupled into the actuating knob and at least partially illuminates an operating side of the actuating knob from the inside. The object is thus solved in that the light source is arranged to generate a light beam which propagates along an axis in a cavity, and in that the actuating element is displaceable along the axis and/or is mounted so as to be pivotable about the axis in such a way that a light incidence surface of the actuating knob is intersected by the axis in each functional position of the actuating element, so that the light beam can enter the actuating knob in each functional position. A functional position is to be understood as meaning any possible position of the actuating element during the use of the ventilation outlet for the control of an air flow.

The actuating knob allows a person's bare hand to move the actuating element to control the ventilation outlet. Such an actuating knob can have various shapes, such as round, cylindrical, hemispherical or spherical cap-shaped, or even a quadrangular or polygonal protruding shape. This term should also cover a control lever or control knob. The actuating knob is an integral part of the actuating element.

For example, the control knob may be slidable, pivotable, rotatable, or able to be pressed in to influence the control of an airflow. Corresponding guides for the above-mentioned types of movement are basically known in engineering. The operating side of the actuating knob usually faces the viewer and is particularly easy to see by the viewer when illuminated from the inside.

Unlike previous solutions, according to the present disclosure, a light beam is transmitted through or propagates in a cavity that is extended along an axis, and a light incident surface of the actuating knob projects into the light beam such that it is intersected by the axis. The guidance of the movement of the actuating element, in particular of the actuating knob, is designed in such a way that the actuating knob projects with the light incidence surface into the light beam as far as possible in all its possible positions for the functioning of the ventilation outlet. Since the light is not guided in a transparent solid body as in the prior art, the light incidence surface of the actuating knob can be designed to be freely movable within the cavity and can be moved between different positions, in each of which the light of the light beam is directed from the light incidence surface into the interior of the actuating knob.

A particular embodiment of the disclosure may, for example, be that the light incidence surface forms part of the surface of the actuating knob or of the continued contour of the surface. In this case, at the light incidence surface, the light beam enters directly into the material of the actuating knob and can be guided within this material to the operating side, where the light can be perceived by an observer.

It may further be provided that a first reflection surface is formed in or on the actuating knob, which reflects or scatters the light beam at least partially in the direction towards the operating side of the actuating knob. Such a reflection surface may, for example, be embedded in the material of the actuating knob, for example as a smooth metal surface, or a smooth surface on the outside of the material of the actuating knob may serve as the reflection surface. A reflection surface can also protrude from the material of the actuating knob as a mirror element. In particular, the reflection surface can cause the light beam to reflect into a light guide made of transparent material.

For this purpose, it can also be provided, for example, that the reflection surface is flat or has a rounded contour. This ensures that even if the actuating knob is moved perpendicular to the axis along which the light beam propagates, the reflection surface receives enough of the light beam and that even if the entry conditions vary slightly, sufficient light is reflected or scattered to the operating side of the actuating knob by fanning out the light beam.

For example, another solution may provide that the reflection surface is refracted and has a plurality of partial surfaces angled in different directions with respect to each other. In this case, a kind of cat's eye, known from light reflectors in the field of bicycle technology, is provided in the actuating knob, so that part of the light introduced into the interior of the actuating knob is directed to the operating side in any case.

In principle, it should be noted that the described reflection surfaces or reflective elements can also be arranged in front of the material of the actuating knob in such a way that they reflect the light irradiated parallel to the axis into the actuating knob and towards its operating side. In these cases, the reflective elements are not or not fully integrated into the material of the actuating knob and may be attached, for example, to the back of the actuating knob opposite the operating side. In this case, the reflection surfaces can also each form the light incidence surface.

In many cases, however, it can advantageously be provided that the actuating knob is solid and consists at least partially of a material that is transparent to the light beam. The actuating knob can then comprise a transparent or translucent plastic or glass, for example, or it can be composed of several different translucent materials.

For example, instead of or in addition to a reflective element, it may also be provided that light-diffusing elements and/or light-conducting channels are arranged inside the actuating knob. Such light-diffusing elements, which can also be formed, for example, by a roughened surface of the material of the actuating knob, ensure that the incident light is scattered within the actuating knob and thus distributed in different directions, so that it is ensured that a certain proportion of the light is directed towards the operating side and can be perceived there by an operating person. Corresponding light-diffusing elements can be formed, for example, by particles or small reflective bodies or bubbles that are mixed or molded into the transparent material of the actuating knob.

A special form of guiding the actuating knob can be realized, for example, by the actuating element having a hollow profile or member, in particular a pipe, which can be displaced on a stationary extruded profile or member having the cavity, for example a rod, in particular a cylinder, in its longitudinal direction or can be rotated about its axis. The hollow profile is an integral part of the actuating element. In this case, the actuating knob can be moved together with the hollow profile on the stationary extruded profile at least in its longitudinal direction or rotated about its axis. A particularly preferred embodiment is one in which the actuating element is both slidable along the axis and rotatable about that axis. Within the extruded profile or rod/pipe, the cavity is provided which extends along the axis of the extruded profile, wherein a light beam is generated by a light source along the axis within the cavity which is incident on the light incident surface of the actuating knob. If the hollow profile is designed as a round pipe guided on a cylinder, in addition to a longitudinal displaceability of the actuating knob, a rotatability about the axis of the cylinder can be provided, for example, to control two different aspects of the air flow by these two degrees of freedom. The cavity inside the cylinder can, for example, be located in the area of the cylinder axis or also outside the cylinder axis, as long as it is ensured that the swivel range of the actuating knob is limited in such a way that the light incidence surface remains in the area of the light beam in each case. The wall of the light-conducting cavity has an opening through which light can be directed from the cavity to the light incidence surface of the actuating knob.

To implement the control movement, for example, the actuating element can be provided with or transmission element that interacts with a pivoting mechanism for one or more flow directing elements. For example, a transmission element may be formed by a lever or edge that cooperates with a corresponding actuating lever of pivotable steering louvers for flow guidance.

In one embodiment, a pivoting movement of the actuating element, in particular the actuating knob, causes a pivotal movement of a flow directing element about a directing element axis that is arranged parallel to the axis about which the actuating element is rotated. The pivoting movement of the actuating element may be transmitted by a transmission element, such as a gear on a pivoting mechanism for one or more flow directing elements. Additionally or alternatively, a sliding movement of the actuating element, in particular of the actuating knob, along the axis causes a pivoting movement of a flow steering element about a directing element axis which is arranged perpendicular to the axis along which the actuating element is slid. The sliding motion of the actuating element can be transmitted from a transmission element, such as a fork or lever, to a pivoting mechanism for one or more flow directing elements.

Finally, it may also be provided that the actuating element comprises a pipe rotatable on a stationary cylinder having the cavity about its axis with the cylinder or relative to the cylinder. In this case, for example, only such a pivoting movement of the actuating knob about the axis of the cylinder can be provided if displaceability in the direction of the cylinder axis is not necessary or desired.

BRIEF DESCRIPTION OF THE FIGURES

The disclosure is shown below with reference to examples of embodiments in figures and described further below. Shown are.

DETAILED DESCRIPTION

Figure 1:
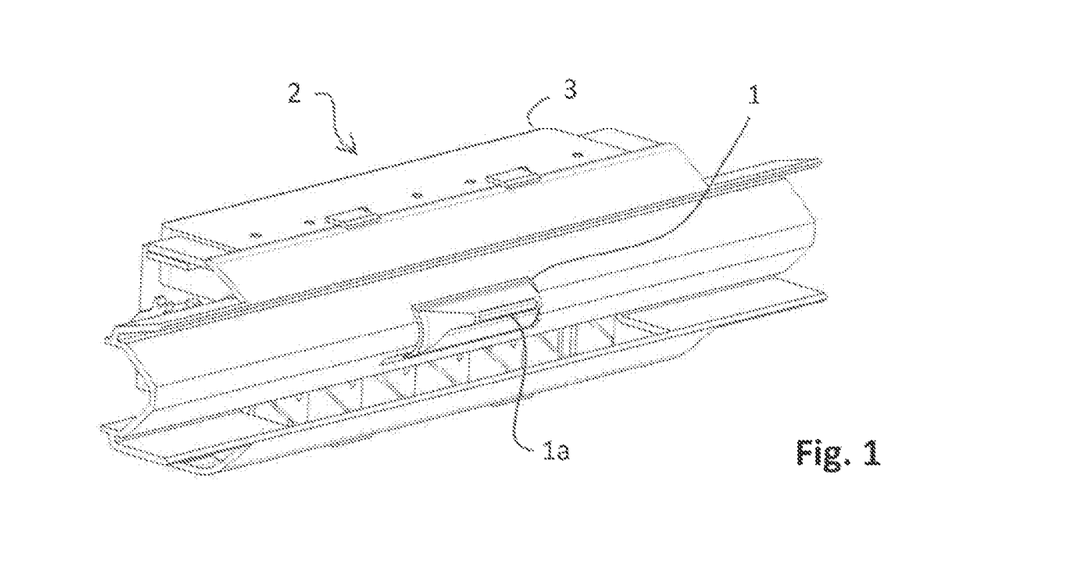
FIG. 1 a perspective view of part of a ventilation outlet from the operating side with an actuating knob, FIG. 2 an enlarged perspective view of the actuating knob from FIG. 1, FIG. 3 a ventilation outlet with louvers visible behind an actuating knob, FIG. 4 a perspective view of an actuating element that is rotatably and slidably mounted on a cylindrical body, FIG. 5 a longitudinal section through the arrangement from FIG. 4, FIG. 6 a cross-section through the actuating knob in enlarged detail, FIG. 7 a further embodiment of an actuating knob in cross-section, and FIG. 8 a perspective view of an actuating element and interaction with a horizontal flow directing element.

FIG. 1 shows a perspective view of an actuating knob 1 of a ventilation outlet 2, which in the example is mounted so as to be both displaceable in the horizontal direction and pivotable in a substantially vertical direction. The mounting of the actuating knob 1 can be seen in the figures commented on in more detail below. In the background of FIG. 1 a housing 3 is shown, in which non-visible steering louvers for a ventilation flow (ventilation louvers) are arranged. The ventilation louvers that form the flow directing elements are shown in FIG. 3.

The housing 3 may be installed in a dashboard of a vehicle, for example. On the actuating knob 1, an illumination surface 1a made clearly visible by emerging light when the operating knob is illuminated can be seen on its operating side. For this purpose, the illumination surface 1a can be roughened or designed to be semi-transparent, for example. In principle, the actuating knob 1 is at least partially made of a material that is transparent to visible light, for example a transparent or translucent plastic or glass.

Figure 2:
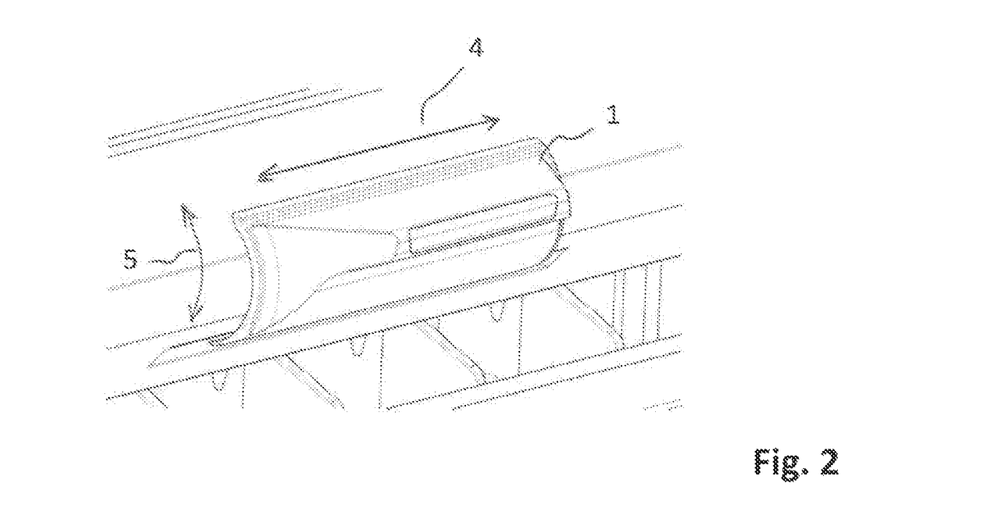

FIG. 2 shows in an enlarged view of the actuating knob 1 that it is displaceable in a first direction along the double arrow 4 and pivotable in a second direction along the double arrow 5 in a substantially vertical direction.

Figure 3:
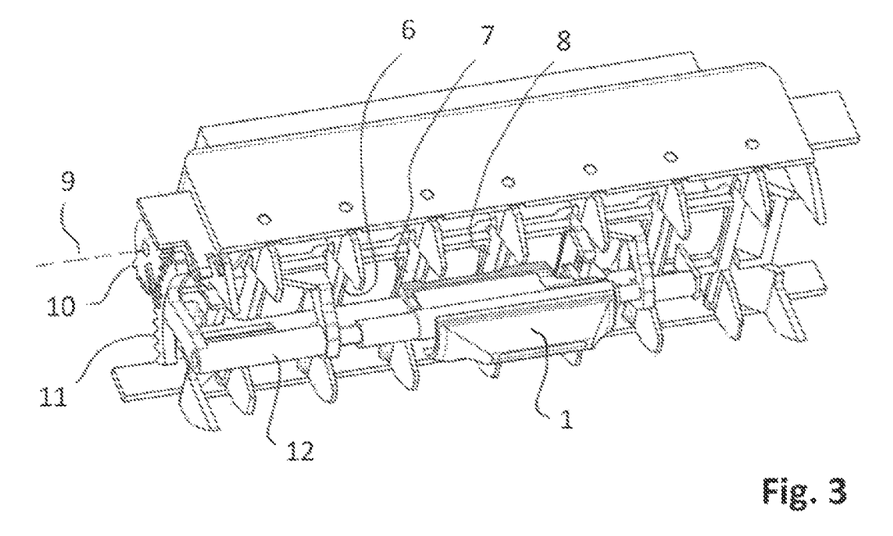

From FIG. 3, by omitting some elements of the design, the interaction of the actuating element 1, 12a, in particular the actuating knob 1, with flow directing elements 6, 7, 8 of the ventilation outlet can be seen. Usually, these flow directing elements are designed as vertically and parallel arranged louvers. The louvers 6, 7, 8 are hinged to one another and can be actuated by means of at least one lever, which is coupled to the actuating knob 1. By moving the actuating knob 1 horizontally together with the pipe 12a in the direction of the arrow 4 in FIG. 2, the louvers are pivoted about a vertical axis in FIG. 3 so that an air flow pivots in the horizontal direction.

When the actuating knob 1 is swiveled in the vertical direction, another flow directing element, which is pivotable about a horizontal directing element axis 9 in FIG. 3, is actuated to allow a ventilation flow to be swiveled in the vertical direction. Usually, this flow element is designed as a horizontally arranged louver. The latter flow directing element, which can be pivoted about a horizontal directing element axis, is not shown in more detail in FIG. 3, but can be seen in FIG. 8, where it is designated by the reference number 30. In FIG. 3, the drive axis 9 of the louvers is drawn on the left side of the figure, around which the gear wheel 10 can be driven. The gear wheel 10 is driven by a segment gear 11, which is connected to a pipe 12, which in turn is connected to the actuating knob 1.

By combined action of horizontal displacement of the actuating element 1, 12a with pivoting in vertical direction, a ventilation flow can sweep a three-dimensional space area with limited extension. In this context, the direction of movement when the actuating knob 1 is pivoted is referred to as vertical, since the pivoting movement is narrowly limited and only a portion of a circular path can be traversed by the actuating knob, which is oriented substantially vertically.

Figure 4:
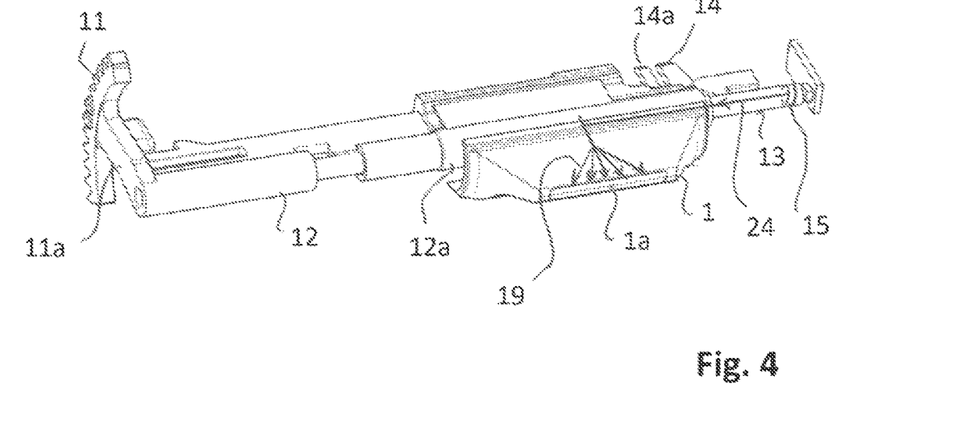

FIG. 4 shows that the actuating element comprises a pipe 12a that is slidable and rotatable on a cylinder 13. The cylinder 13 is formed as a hollow cylinder in which, as can be seen more clearly from FIG. 5, a cavity 13a is arranged which extends in the longitudinal direction of the cylinder 13 as far as the actuating knob 1 and beyond, and which forms the cavity in which the light beam propagates. In this figure, an opening in a wall of the cavity can also be seen. A light guide (18) protrudes through this opening, which is part of the actuating knob and through which light is guided from the cavity to the operating side of the actuating knob. This opening is covered by the pipe 12a.

The actuating fork 14, 14a cooperates with a lever that actuates the vertical steering louvers 6, 7, 8. The pipe 12 is configured so that the actuating element 1, 12a is displaceable relative to it in the direction of its longitudinal axis. When the actuating element 1, 12a rotates, it takes the pipe 12 with it and also sets it in a rotating motion. Connected to the pipe 12 is a lever 11a which carries at its free end a segment gear 11 for driving the gear wheel 10 (cf. FIG. 3). Thus, via the segmental gear 11, the pivoting movement of the actuating element is transmitted to a flow directing element, in particular a horizontal louver, in the vertical direction. In other embodiments, multiple flow directing elements arranged parallel to each other may also be provided. The elements referred to can be seen in a longitudinal section in FIG. 5.

Figure 5:
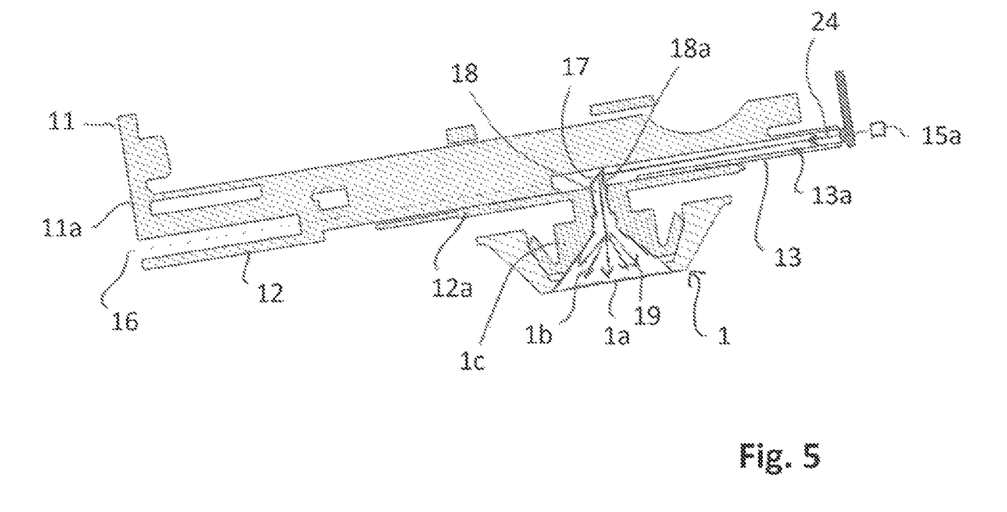
Figure 6:
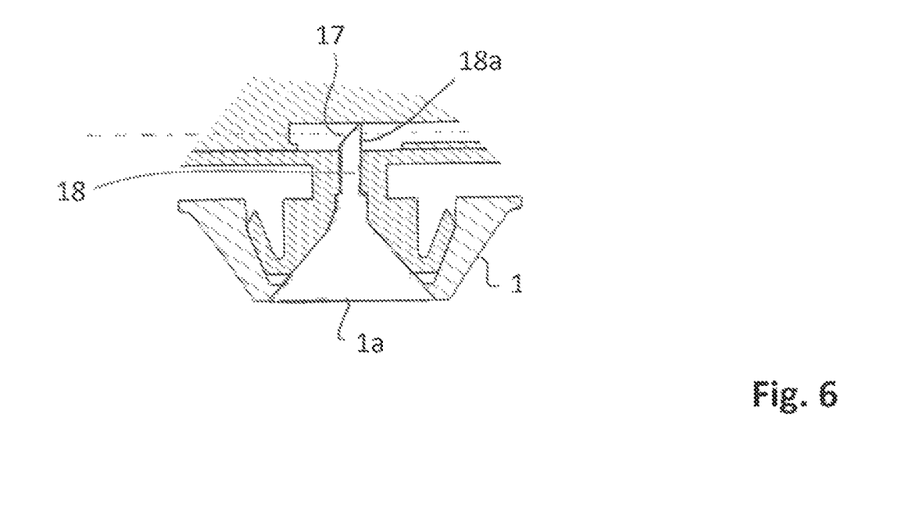

In FIG. 4, a light source 15 is schematically indicated inside the cylinder 13, which can be formed by a light-emitting diode, for example. By way of example, FIG. 5 schematically shows a light source 15a outside the cylinder, from which light can be irradiated into the cylinder 13 and into its cavity 13a. For example, the light can be irradiated directly through an opening or introduced into the cylinder 13 through an optical fiber. Here, the light can have different colors, for example red, green or blue, or a mixture of colors or a color dependent on environmental or operating conditions. The light beam 24 propagates in the direction of the axis 16 in the cavity 13a, which is best seen in FIG. 5 and which may, for example, be cylindrical within the cylinder 13. At the level of the actuating knob 1, the light beam falls on a reflection surface 17, which in the example of FIG. 5 is formed by a boundary surface of the transparent material of the actuating knob 1. In this case, the light beam enters the material of the actuating knob on the side facing the light source 15a through a light incidence surface (cf. FIG. 6) and is reflected on its rear side at the reflection surface 17 toward the operating side and the illumination surface 1a. For this purpose, the material of the actuating knob 1 has a projection 18 which projects into the light beam 24. The transparent material of the actuating knob 1 can, for example, be inserted as a cone-shaped insert 1b in a non-optically transparent receiving part 1c of the actuating knob, where it can be glued in place, for example. This prevents unwanted ambient light from entering the transparent part 1b of the actuating knob 1 from the side.

The light incidence surface of the actuating knob 1 is formed by the light incidence surface 18a in the case of the example shown in FIGS. 4 and 5. It will be shown below with reference to FIG. 7 that a light incidence surface of an actuating knob can also be designed in a different way.

In FIG. 4 and in FIG. 5, light beams 19 are shown schematically inside the actuating knob 1, which can expand in a fan-like manner in the material of the actuating knob towards the operating side and the illumination surface 1a in order to illuminate the entire illumination surface 1a.

FIG. 6 again shows an enlarged cross-section through the actuating knob 1, which has on its side opposite the operating side and the illumination surface 1a the rod-shaped projection 18 with the light incidence surface 18a for introducing and deflecting the light beam 24 which is irradiated along the axis 16. In this variant of the actuating knob, the light beam first enters the material of the actuating knob and is reflected at its rear reflection surface 17 toward the illumination surface 1a.

Figure 7:
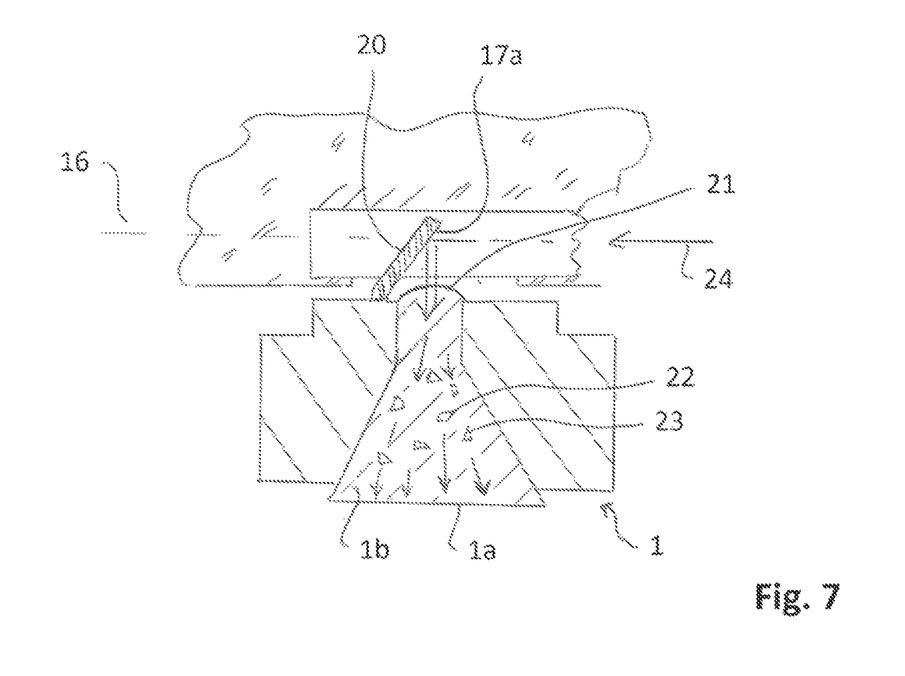

FIG. 7 shows a variant in which the reflection surface 17a is formed as a mirror provided outside the transparent material of the cone 1b of the actuating knob 1. The reflection surface 17a is thus part of a mirror body 20 that projects into the light path of the light beam propagating along the axis 16. The light is reflected into the interior of the cone-shaped body 1b by the reflection surface 17a, wherein a boundary surface 21 of the cone-shaped body 1b may be curved to form an entrance lens that may cause the light beam to expand toward the illumination surface 1a. In this constellation, the reflection surface 17a acts as a light incidence surface.

In addition, light scattering bodies 22, 23 are exemplarily drawn in FIG. 7 within the transparent material of the cone 1b, through which the light can be scattered on its way to the illumination surface 1a in such a way that the illumination surface is uniformly illuminated. Such light-diffusing elements can of course also be provided in the variant of the actuating knob shown in FIG. 6. Such scattering centers can also be generated, for example, by air bubbles within the transparent material of the actuating knob.

Figure 8:
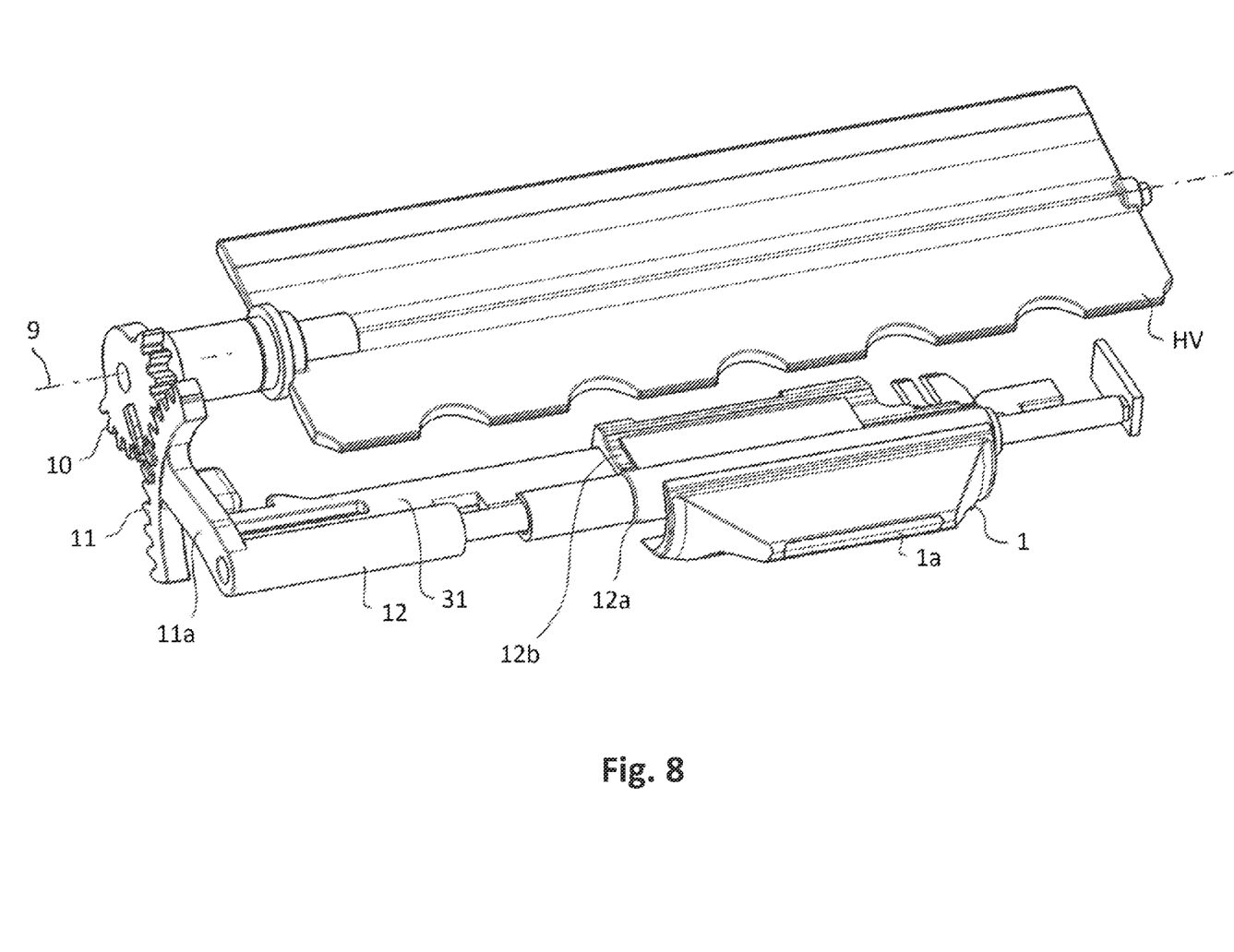

FIG. 8 shows the drive of a horizontal louver HV, which forms a flow directing element for pivoting an air flow in vertical direction. The louver HV is rotatable about the axis 9 by driving the segment gear 10 through the gear 11. This is done by a pivoting movement of the lever 11a, which is connected to the pipe 12. The pipe 12 is connected to the rail 31, which moves along with a pivoting movement of the profile 12b, which is slidable on the rail 31. The profile 12b is connected to the actuating element 1, 12a and may also be part of the actuating element.

The embodiment of an actuating knob for a ventilation outlet according to the disclosure permits illumination of the actuating knob in a simple and less complex manner, whereby the illumination can be ensured to a large extent independently of the respective position of the actuating knob.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A ventilation outlet, comprising:
one or more flow directing elements arranged movably in a housing;
an actuating element mounted movably on the housing;
an actuating knob for actuating at least one flow directing element for controlling a ventilation gas flow; and
a light source for illuminating the actuating knob, wherein a movable mounting of the actuating element permits a movement of the actuating element with at least one degree of freedom, wherein the light source is arranged outside the actuating knob in such a way that light emitted from the light source is directed into the actuating knob and at least partially illuminates an operating side of the actuating knob from inside the actuating knob, wherein the light source is arranged to generate a light beam which propagates along an axis in a cavity, wherein the actuating element is at least one of displaceable along the axis or mounted so as to be pivotable about the axis in such a way that a light incidence surface of the actuating knob is intersected by the axis in each functional position of the actuating element, and wherein in each functional position of the actuating element, the light beam enters the actuating knob.

2. The ventilation outlet according to claim 1, wherein the light incidence surface forms part of a surface of the actuating knob or of a continued contour of the light incidence surface.

3. The ventilation outlet according to claim 1, wherein a first reflection surface is formed in or on the actuating knob, wherein the first reflection surface at least one of reflects or scatters the light beam at least partially toward the operating side of the actuating knob.

4. The ventilation outlet according to claim 3, wherein the first reflection surface is flat.

5. The ventilation outlet according to claim 3, wherein the first reflection surface is formed with a rounded contour.

6. The ventilation outlet according to claim 3, wherein the first reflection surface is divided and includes multiple partial surfaces, and wherein the multiple partial surfaces are angled in different directions with respect to each other.

7. The ventilation outlet according to claim 1, wherein the actuating knob is solid and at least partially comprises a material that is transparent to the light beam.

8. The ventilation outlet according to claim 1, wherein at least one of one or more light-diffusing elements or one or more light-conducting channels are arranged inside the actuating knob.

9. The ventilation outlet according to claim 1, wherein the actuating element comprises a hollow member which is one or more of displaceable on a stationary extruded member that includes the cavity, in a longitudinal direction thereof or is rotatable about the axis.

10. The ventilation outlet according to claim 9, wherein the hollow member includes a pipe.

11. The ventilation outlet according to claim 9, wherein the stationary extruded member is a cylindrically shaped rod.

12. The ventilation outlet according to claim 1, wherein the actuating element comprises a transmission element configured to interact with a pivoting mechanism for a particular flow directing element of the one or more flow directing elements.

13. The ventilation outlet according to claim 12, wherein the pivoting mechanism includes an actuation lever, and wherein the transmission element is configured to operate in conjunction with the actuation lever.

14. The ventilation outlet according to claim 12, wherein at least one of a pivoting movement of the actuating knob causes a pivoting movement of the particular flow directing element about a directing element axis parallel to the axis or a sliding movement of the actuating knob causes a pivoting movement of the particular flow directing element about a directing element axis perpendicular to the axis.

15. A ventilation outlet comprising:
a housing;
a flow directing element located in the housing and configured to move within the housing;
an actuating element mounted movably on the housing;
an actuating knob for actuating the flow directing element for controlling a ventilation gas flow; and
a light source for illuminating the actuating knob, wherein the light source is arranged outside the actuating knob such that light emitted from the light source is directed into the actuating knob and at least partially illuminates an operating side of the actuating knob from inside the actuating knob, wherein the light source is arranged to generate a light beam that propagates along an axis in a cavity, wherein a first reflection surface is formed in or on the actuating knob, wherein the first reflection surface at least one of reflects or scatters the light beam at least partially toward the operating side of the actuating knob, wherein the actuating element is at least one of displaceable along the axis or mounted so as to be pivotable about the axis so that a light incident surface of the actuating knob is intersected by the axis in a functional position of the actuating element, and wherein in the functional position of the actuating element, the light beam enters the actuating knob.

16. The ventilation outlet of claim 15, wherein the light incident surface forms at least part of a surface of the actuating knob, wherein the actuating knob is a solid piece, and wherein the actuating knob at least partially comprises a material that is transparent to the light beam.

17. The ventilation outlet of claim 15, wherein the actuating knob includes at least one of a light-diffusing element or a light-conducting channel arranged inside the actuating knob.

18. A ventilation outlet comprising:
a housing;
a flow directing element located in the housing and configured to move within the housing;
an actuating element mounted movably on the housing;
an actuating knob for actuating the flow directing element for controlling a ventilation gas flow, wherein the actuating knob includes at least one of a light-diffusing element or a light-conducting channel arranged inside the actuating knob; and
a light source for illuminating the actuating knob, wherein the light source is arranged outside the actuating knob such that light emitted from the light source is directed into the actuating knob and at least partially illuminates an operating side of the actuating knob from inside the actuating knob, wherein the light source is arranged to generate a light beam that propagates along an axis in a cavity, wherein a first reflection surface is formed in or on the actuating knob, wherein the first reflection surface at least one of reflects or scatters the light beam at least partially toward the operating side of the actuating knob, wherein the first reflection surface includes two or more partial surfaces angled in different directions with respect to each other, wherein the actuating element is at least one of displaceable along the axis or mounted so as to be pivotable about the axis so that a light incident surface of the actuating knob is intersected by the axis in a functional position of the actuating element, and wherein in the functional position of the actuating element, the light beam enters the actuating knob.

19. The ventilation outlet of claim 18, wherein the actuating element includes a hollow member displaceable on a stationary extruded member, wherein the stationary extruded member includes the cavity.

20. The ventilation outlet of claim 19, wherein the hollow member is rotatable about the axis.

* * * * *